Aug. 1, 1939.    H. T. SEELEY    2,168,175

SYNCHRONIZING SYSTEM

Filed Oct. 11, 1938

Inventor:
Harold T. Seeley,
by Harry E. Dunham
His Attorney.

Patented Aug. 1, 1939

2,168,175

UNITED STATES PATENT OFFICE 2,168,175

SYNCHRONIZING SYSTEM

Harold T. Seeley, Lansdowne, Pa., assignor to General Electric Company, a corporation of New York Application October 11, 1938, Serial No. 234,431

6 Claims. (Cl. 171—118)

My invention relates to synchronizing systems for controlling the closing of a circuit breaker between two alternating current circuits and particularly to an improved arrangement for initiating the closing operation of the circuit breaker at substantially the same phase angle between the voltages of the two circuits for all frequency differences below a predetermined value.

My invention is particularly applicable for use in synchronizing systems of the type disclosed and claimed in United States Letters Patent 1,852,825, granted April 5, 1932, on an application filed by me and assigned to the same assignee as this application. In the aforesaid Letters Patent the alternating current generator is excited so as to produce a voltage reasonably free from variations in magnitude due to previous magnetizations of the generator but not high enough to cause the motor to pull into synchronism and then, while maintaining the subnormal excitation, the generator is connected to the alternating current system during a predetermined range of the voltages of the generator and system if frequency difference is less than the predetermined value. In the embodiment of the invention disclosed in the aforesaid patent the closing operation of the circuit breaker between the generator and the alternating current system is initiated at different points within a 180° phase angle range of the generator and system voltages depending upon the frequency difference. For example, at the maximum frequency difference at which the synchronizing arrangement will effect the closing of the circuit breaker the closing operation is initiated at an angle substantially at the end of the 180° phase angle range, whereas, if the frequency difference is substantially zero, the closing operation is initiated at an angle substantially at the beginning of the 180° phase angle range.

One object of my present invention is to provide an arrangement whereby the closing indication is given at substantially the same angle in the phase angle range irrespective of the frequency difference so long as it is below a predetermined value.

Figure 1:
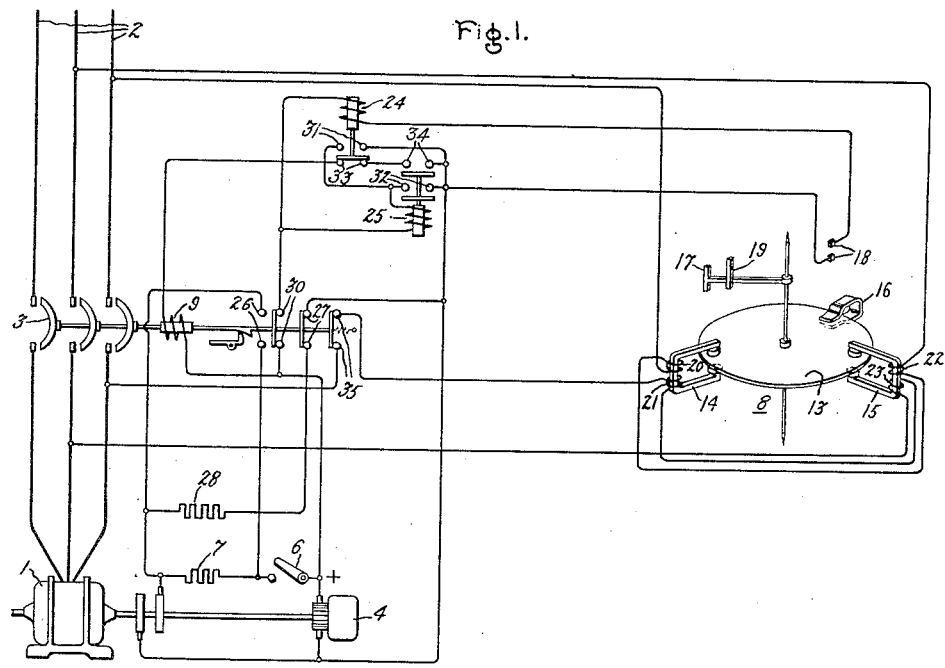
Figure 2:
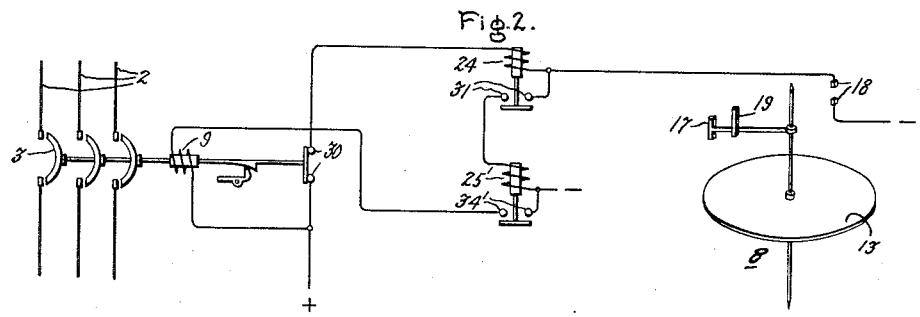

My invention will be better understood from the following description when taken in connection with the accompanying drawing, Fig. 1 of which shows diagrammatically an automatic synchronizing arrangement embodying my invention, Fig. 2 of which discloses a modification of a portion of the arrangement shown in Fig. 1, and its scope will be pointed out in the appended claims.

Referring to Fig. 1 of the drawing, 1 represents a polyphase generator which is adapted to be connected to a polyphase circuit 2 by means of a circuit breaker 3 which may be of any suitable type examples of which are well known in the art. The generator 1 may be driven by any suitable type of prime mover, not shown.

For controlling the excitation of the generator 1 a suitable source of direct current, shown as an exciter 4 directly connected to the generator 1, is provided. The field winding of the generator 1 is arranged to be connected to the terminals of the exciter 4 by means of a suitable control switch 6 which may be operated either manually or automatically. In the particular embodiment of my invention, shown in Fig. 1, the amount of direct current supplied to the generator field winding, while the switch 6 is closed and the circuit breaker 3 is open, is just sufficient to produce a voltage across the generator terminals which is reasonably free from variations in magnitude due to previous magnetizations of the generator field structure but is not sufficient to pull the generator into synchronism when it is connected to the circuit 2. In the arrangement shown, the desired subnormal excitation is obtained by connecting suitable current limiting means, such as a resistor 7, in series with the exciter 4 and the generator field winding.

For effecting the closing of the circuit breaker 3 at substantially the same phase angle between the voltages of the generator 1 and the circuit 2 at all frequency differences below a predetermined value, I provide a phase responsive relay 8 comprising an induction disk 13 which has opposing torques exerted thereon by the shaded pole motor elements 14 and 15. Suitable means, such as a drag magnet 16, is provided to exert a retarding force on the disk 13 so that the desired time delay action in the movement of the disk 13 may be obtained. Attached to the disk 13 is a contact member 17 which is arranged to be moved into engagement with the stationary contacts 18 after the torque of the motor element 14 has exceeded the torque of the motor element 15 for a time interval determined by the drag magnet 16. When the torque of the motor element 15 exceeds the torque of the motor element 14, the contact member 17 is arranged to be moved in the opposite direction so as to engage the stationary stop 19.

The motor element 14 is energized by the windings 20 and 21 which are respectively connected to the circuit 2 and the generator 1 so that a torque is exerted on the disk 13 in accordance with the vector difference between the voltages of the circuit 2 and the generator 1 and in a direction to move the contact member 17 into engagement with contacts 18. The motor element 15 is provided with the windings 22 and 23 which are respectively energized by the same voltages which energize the windings 20 and 21 of the motor element 14. The windings 22 and 23 are so arranged that they exert a torque on the disk 13 in accordance with the vector sum of the voltages impressed thereon and in a direction to move the contact member 17 away from the contacts 18. The motor elements 14 and 15 are preferably arranged so that during each cycle of frequency difference between the voltages of the circuit 2 and the generator 1, a resultant torque in the direction to close the contacts 18 is produced during approximately a 170° phase angle range of the voltages, and during the remaining approximately 190° phase angle range of the voltages a resultant torque is exerted on the disk 13 in a direction to maintain the contact member 17 out of engagement with the contacts 18. Therefore, the average resultant torque during each cycle of frequency difference is in a direction to maintain the contacts 18 open. Due to the retarding effect exerted by the drag magnet 16, it will be observed that only when the frequency difference between the voltages of the generator 1 and the circuit 2 is less than a predetermined value will the resultant torque in a direction to close the contacts 18 be exerted for a sufficient length of time to accomplish this result.

It will be observed, however, that the phase angle at which the contacts 18 close varies with the frequency difference, but after being closed, they are opened at substantially the same phase angle irrespective of the frequency difference because as soon as the torque exerted by the motor element 15 predominates, and this occurs at substantially the same phase angle for all frequency differences, the contact member 17 immediately moves out of engagement with contacts 18 because the drag magnet 16 has very little retarding effect during the slight movement of the disk 13 required to separate the contacts 17 and 18. Therefore, if the motor element 14 is designed so that its torque predominates over the torque of motor element 15 during the 180° phase angle range during which the voltages are more than 90° apart, the contacts 18 will always open at approximately 90° ahead of phase coincidence.

In accordance with my present invention, I make use of this opening of the contacts 18 at substantially the same phase angle at all frequency differences to initiate the closing operation of the circuit breaker 3.

In the arrangement shown in Fig. 1, the closing of the contacts 18 effects the energization of a control relay 24 which in turn effects the energization of a second control relay 25 which completes a locking circuit for itself independently of the contacts 18 of relay 8 and the contacts 31 of control relay 24. Then, when the contacts 18 are subsequently opened so that the relay 24 is deenergized, a circuit is completed for the closing coil 9 of the circuit breaker 3 through series connected contacts of the deenergized control relay 24 and the energized control relay 25.

After the circuit breaker 3 is closed to connect the generator 1 to the circuit 2, it is desirable to increase the excitation of the generator to its normal value so as to pull the generator into synchronism. In the arrangement shown in the drawing this result is accomplished by providing the circuit breaker 3 with the auxiliary contacts 26 which short-circuit the resistor 7 in the field circuit of the generator 1 when the circuit breaker 3 is closed.

Since the windings 21 and 23 of the phase responsive relay 8 are connected so that they are energized by the relatively low voltage of the generator 1 prior to the closing of the circuit breaker 3, it is necessary to protect these windings against the relatively high voltage which would be applied to them in response to the closing of the circuit breaker 3. In the arrangement shown in the drawing, this protection is obtained by connecting the auxiliary contacts 35 of the circuit breaker 3 in the energizing circuit of the windings 21 and 23 so that this circuit is interrupted by the closing of the circuit breaker 3.

In order to prevent the voltage induced in the generator field winding from rising to a dangerous value when the circuit breaker 3 is closed, I connect, by means of the auxiliary contacts 27 of circuit breaker 3, a discharge resistor 28 across the terminals of the generator field winding. Preferably the contacts 27 are arranged in a manner well known in the art so as to overlap the contacts 26 so that the contacts 26 are closed before the contacts 27 are opened and vice versa.

The operation of the arrangement shown in Fig. 1 of the drawing is as follows: When it is desired to place the generator 1 in operation, it is first brought up to approximately synchronous speed by controlling the speed of the prime mover which drives it and then the field switch 6 is closed so that a sufficient direct current flows through the generator field winding to produce the desired subnormal generator voltage. When the generator voltage builds up to this predetermined subnormal value and the frequency difference between this subnormal voltage and the voltage of the circuit 2 is less than a predetermined value, the relay 8 closes its contacts 18 at some predetermined phase angle in the 180° phase angle range during which the torque exerted by the motor element 14 predominates over the torque exerted by the motor element 15 and maintains these contacts 18 closed until the end of this phase angle range. The closing of the contacts 18 completes across the exciter through the auxiliary contacts 30 on the circuit breaker 3 an energizing circuit for the control relay 24 which in turn by closing its contacts 31 completes across the exciter an energizing circuit for the control relay 25 through the auxiliary contacts 30 on the circuit breaker 3. By closing its contacts 32 relay 25 completes a locking circuit for itself around the contacts 31 of the relay 24. When the relay 8 opens its contacts 18 and thereby deenergizes the control relay 24, an energizing circuit is completed across the exciter for the closing coil 9 of the circuit breaker 3 through the contacts 33 of the deenergized control relay 24 and the contacts 34 of the energized control relay 25 so that the subnormally excited generator 1 is connected across the circuit 2. By opening its contacts 35 the circuit breaker 3 interrupts the circuit of the low voltage windings 21 and 23 of the relay 8 and by opening its contacts 30 interrupts the holding circuit of the control relay 25. By closing its auxiliary contacts 26, the circuit breaker 3 short-circuits the resistor 7 so that the excitation of the generator 1 builds up to its normal value and causes the generator to pull into synchronism, and then by opening its contacts 27, the discharge resistor 28 is disconnected from across the terminals of the generator field winding.

In the modification shown in Fig. 2 the closing of the contact 31 of the control relay 24 when it is energized in response to the closing of the contacts 18 of the relay 8 connects the winding of the control relay 25' in parallel with the contacts 18 so that, when these contacts are subsequently opened, the relay 25' becomes energized and by closing its contacts 34' completes an energizing circuit for the closing coil 9 of the circuit breaker 3.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. An arrangement for closing a circuit breaker in response to the phase relation between the voltages of two alternating current circuits comprising contacts having a normal condition and a second condition, a movable member for changing said contacts from one condition to the other, means energized from said circuits for exerting on said member during a predetermined phase range of the voltages of said circuits a torque in a direction to change said contacts to said second condition and a torque in the opposite direction during the remaining phase range of said voltages, means for controlling the movement of said member in said first mentioned direction so that said contacts are changed to said second condition only when the frequency difference between said voltages is less than a predetermined value, and means dependent upon said contacts being in said second condition and subsequently out of said second condition for effecting the closing operation of the circuit breaker.

2. An arrangement for closing a circuit breaker in response to the phase relation between the voltages of two alternating current circuits comprising normally open contacts, a movable member for closing said contacts when moved a predetermined distance in a predetermined direction, means energized from said circuits for exerting on said member during a predetermined phase range of the voltages of said circuits a torque in a direction to close said contacts and in the opposite direction during the remaining phase range of said voltages, means for delaying the movement of said member in said contact closing direction whereby said contacts are closed only when the frequency difference between said voltages is less than a predetermined value, and means dependent upon the closing and the subsequent opening of said contacts for effecting the closing operation of the circuit breaker.

3. An arrangement for closing a circuit breaker in response to the phase relation between the voltages of two alternating current circuits comprising normally open contacts, a movable member for closing said contacts when moved a predetermined distance in a predetermined direction, means energized from said circuits for exerting on said member during a predetermined phase range of the voltages of said circuits a torque in a direction to close said contacts and in the opposite direction during the remaining phase range of said voltages, means for delaying the movement of said member in said contact closing direction whereby said contacts are closed only when the frequency difference between said voltages is less than a predetermined value, a relay, means responsive to the closing of said contacts for energizing said relay, and means responsive to the opening of said contacts while said relay is energized for closing said circuit breaker.

4. An arrangement for closing a circuit breaker in response to the phase relation between the voltages of two alternating current circuits comprising normally open contacts, a movable member for closing said contacts when moved a predetermined distance in a predetermined direction, means energized from said circuits for exerting on said member during a predetermined phase range of the voltages of said circuits a torque in a direction to close said contacts and in the opposite direction during the remaining phase range of said voltages, means for delaying the movement of said member in said contact closing direction whereby said contacts are closed only when the frequency difference between said voltages is less than a predetermined value, a relay, means responsive to the closing of said contacts for energizing said relay, means for maintaining said relay in its energized position when said contacts are subsequently opened, and means responsive to the opening of said contacts while said relay is energized for closing said circuit breaker.

5. An arrangement for closing a circuit breaker in response to the phase relation between the voltages of two alternating current circuits comprising normally open contacts, a movable member for closing said contacts when moved a predetermined distance in a predetermined direction, means energized from said circuits for exerting on said member during a predetermined phase range of the voltages of said circuits a torque in a direction to close said contacts and in the opposite direction during the remaining phase range of said voltages, means for delaying the movement of said member in said contact closing direction whereby said contacts are closed only when the frequency difference between said voltages is less than a predetermined value, an auxiliary relay, an energizing circuit for said relay including said contacts, a second auxiliary relay, means responsive to the energization of said first mentioned auxiliary relay for effecting the energization of said second auxiliary relay, a locking circuit for said second relay for maintaining said second relay energized independently of said first mentioned relay, and means responsive to the deenergization of said first mentioned relay while said second relay is energized for closing said circuit breaker.

6. An arrangement for closing a circuit breaker in response to the phase relation between the voltages of two alternating current circuits comprising normally open contacts, a movable member for closing said contacts when moved a predetermined distance in a predetermined direction, means energized from said circuits for exerting on said member during a predetermined phase range of the voltages of said circuits a torque in a direction to close said contacts and in the opposite direction during the remaining phase range of said voltages, means for delaying the movement of said member in said contact closing direction whereby said contacts are closed only when the frequency difference between said voltages is less than a predetermined value, an auxiliary relay, an energizing circuit for said relay including said contacts, a second auxiliary relay, means responsive to the energization of said first mentioned relay for connecting said second auxiliary relay in parallel with said contacts whereby said relays are energized in series in response to the subsequent opening of said contacts, and means responsive to the energization of said second auxiliary relay for effecting the closing of said circuit breaker.

HAROLD T. SEELEY.